United States Patent
Faulkner et al.

(10) Patent No.: US 8,229,203 B2
(45) Date of Patent: Jul. 24, 2012

(54) DYNAMIC PRINT CONTRAST SIGNAL DETERMINATION FOR PAPER DOCUMENTS

(75) Inventors: Bill Faulkner, Waterloo (CA); Dmitri Eidenzon, Waterloo (CA)

(73) Assignee: RDM Corporation, Ontario (CA)

( * ) Notice: Subject to any disclaimer, the term of this patent is extended or adjusted under 35 U.S.C. 154(b) by 938 days.

(21) Appl. No.: 12/260,726

(22) Filed: Oct. 29, 2008

(65) Prior Publication Data

US 2010/0103475 A1 Apr. 29, 2010

(51) Int. Cl.
*G06K 9/00* (2006.01)
(52) U.S. Cl. .......................... 382/137; 382/286
(58) Field of Classification Search ............... 382/137, 382/138, 139, 140, 286; 705/45
See application file for complete search history.

(56) References Cited

U.S. PATENT DOCUMENTS 5,157,740 A * 10/1992 Klein et al. ............... 382/51
6,014,454 A * 1/2000 Kunkler ..................... 382/137

* cited by examiner

*Primary Examiner* — Andrew W Johns
(74) *Attorney, Agent, or Firm* — Ohlandt, Greeley, Ruggiero & Perle, LLP

(57) ABSTRACT

A plurality of PCS values are determined for a document having an area of interest containing critical data and a background image. Reflectance values distributed across the document are obtained and PCS threshold values corresponding to a plurality of locations on the document are stored in memory. Respective PCS values of a plurality of target portions of the surface are determined, each respective PCS value based on a reflectance value of the corresponding target portion and a reflectance value of a corresponding region located adjacent to the target portion, each of the regions being different for each target portion, each PCS value assigned a location representative of the location of the target portion, the size of the region being greater than the size of the target portion. The stored PCS threshold values are compared with the calculated PCS values to determine the acceptability of the background image.

20 Claims, 8 Drawing Sheets

DYNAMIC PRINT CONTRAST SIGNAL DETERMINATION FOR PAPER DOCUMENTS

FIELD OF INVENTION

The present invention relates to image processing of paper documents.

BACKGROUND

The current paper document-processing environment is dependent upon paper processing, which can be inefficient. What is needed is an efficient electronic paper document design process that confirms a paper document design that will be compatible with current electronic capture, storage, and processing system, which are used to alleviate or otherwise mitigate the dependence upon paper form of items such as personal and business checks, for example. Since a vast majority of checks are transported physically via air from one bank to another, and planes can be grounded for a variety of reasons, substantial costs can be incurred by banks due to check processing being delayed. The current system relies upon the physical movement of original paper checks from the bank where the checks are deposited to the bank that pays them, which can be inefficient and costly.

Under current law, a bank may send the original paper check for payment unless it has an electronic payment agreement with the paying bank. Under Check 21 legislation in the United States, by authorizing the use of a new negotiable instrument called a "substitute check" (aka image replacement document), electronic check processing is enabled without mandating that any bank change its current check collection practices. The substitute check is a paper reproduction of an original check that contains an image of the front and back of the original check, which is suitable for automated processing in the same manner as the original check, as long as the check image meets other technical requirements, such as having mandated image quality, otherwise referred to as image readiness that includes acceptable print contrast between the check background and any critical data (e.g. signatures, printed amounts, etc.) placed over the background.

As a result of Check 21, banks that wish to scan the original paper check to create a substitute check require it to satisfy print contrast signal (PCS) standards with respect to the check background. Print contrast acceptability is the design attribute of a check that ensures optimum recognition of amounts, legibility of handwriting, and reasonably low file size that are positioned overtop of any background design images on the surface of the check. Current testing of print contrast is done by calculating a subjectively selected portion of the background of the printed document (e.g. check) using a static background image sample as representative for the print contrast of the entire document. For example, excessive background clutter resulting from the background image(s) causes interference with the legibility of handwritten data (i.e. critical data) and low background reflectance of the background image(s) causes handwritten data to drop out due to insufficient contrast.

Unfortunately, current testing is only a statically selected background sample is used to test print contrast signal compliance of the check document design, which can be subjective as each tester can get a different print contrast signal of a check depending upon the static background image sample that is selected by the tester. This manual testing process is inefficient in cost and time due to the check designs that may pass some PCS testing only to fail PCS standards when processed by other check image processing equipment.

SUMMARY

There is a need for a method and a system for paper document design that overcomes or otherwise mitigates a disadvantage of the prior art.

Current testing is only a statically selected background sample is used to test print contrast signal compliance of the check document design, which can be subjective as each tester can get a different print contrast signal of a check depending upon the static background image sample that is selected by the tester. This manual testing process is inefficient in cost and time due to the check designs that may pass some PCS testing only to fail PCS standards when processed by other check image processing equipment. Contrary to current systems and methods there is provided a system and method for determining a plurality of PCS values for a document image representing a document having at least one area of interest on a surface of the physical item for containing critical data and a background image positioned on the surface, the document suitable for positioning in a digital image capturing device, the system comprising: an input module configured for obtaining a plurality of reflectance values distributed across the surface of the document; a memory configured for storing a plurality of PCS threshold values assigned to a corresponding plurality of locations on the surface; a calculation module configured for determining respective PCS values of a plurality of target portions of the surface, each of the respective PCS values based on a target reflectance value of the corresponding target portion and a region reflectance value of a corresponding defined region located adjacent to the target portion on the surface, each of the defined regions being different for each of the target portions, each of the respective PCS values assigned a location of the surface representative of the location of the target portion, the size of the defined region being greater than the size of the target portion, the target reflectance values and the region reflectance values being determined from said plurality of reflectance values; a comparison module configured for determining from the memory a plurality of PCS threshold values having specified surface locations matching the assigned locations of the calculated PCS values and for comparing the PCS threshold values with the calculated PCS values to determine whether the target portions satisfy their respective PCS threshold values; wherein the degree of target portions that satisfy their PCS threshold value is indicative of the acceptability of the design of the background image when processed by the digital image capturing device.

One aspect provided is a system for determining a plurality of PCS values for a document image representing a document having at least one area of interest on a surface of the physical item for containing critical data and a background image positioned on the surface, the document suitable for positioning in a digital image capturing device, the system comprising: an input module configured for obtaining a plurality of reflectance values distributed across the surface of the document; a memory configured for storing a plurality of PCS threshold values assigned to a corresponding plurality of locations on the surface; a calculation module configured for determining respective PCS values of a plurality of target portions of the surface, each of the respective PCS values based on a target reflectance value of the corresponding target portion and a region reflectance value of a corresponding defined region located adjacent to the target portion on the surface, each of the defined regions being different for each of the target portions, each of the respective PCS values assigned a location of the surface representative of the location of the target portion, the size of the defined region being greater than the size of the target portion, the target reflectance values and the region reflectance values being determined from said plurality of reflectance values; a comparison module configured for determining from the memory a plurality of PCS threshold values having specified surface locations matching the assigned locations of the calculated PCS values and for comparing the PCS threshold values with the calculated PCS values to determine whether the target portions satisfy their respective PCS threshold values; wherein the degree of target portions that satisfy their PCS threshold value is indicative of the acceptability of the design of the background image when processed by the digital image capturing device.

A further aspect provided is a method for determining a plurality of PCS values for a document image representing a document having at least one area of interest on a surface of the physical item for containing critical data and a background image positioned on the surface, the document suitable for positioning in a digital image capturing device, the method comprising: obtaining a plurality of reflectance values distributed across the surface of the document; accessing a plurality of PCS threshold values assigned to a corresponding plurality of locations on the surface; determining respective PCS values of a plurality of target portions of the surface, each of the respective PCS values based on a target reflectance value of the corresponding target portion and a region reflectance value of a corresponding defined region located adjacent to the target portion on the surface, each of the defined regions being different for each of the target portions, each of the respective PCS values assigned a location of the surface representative of the location of the target portion, the size of the defined region being greater than the size of the target portion, the target reflectance values and the region reflectance values being determined from said plurality of reflectance values; determining from the memory a plurality of PCS threshold values having specified surface locations matching the assigned locations of the calculated PCS values; and comparing the PCS threshold values with the calculated PCS values to determine whether the target portions satisfy their respective PCS threshold values; wherein the degree of target portions that satisfy their PCS threshold value is indicative of the acceptability of the design of the background image when processed by the digital image capturing device.

BRIEF DESCRIPTION OF THE DRAWINGS

These and other features will become more apparent in the following detailed description in which reference is made to the appended drawings by way of example only, wherein.

DESCRIPTION

Paper Documents 12

Figure 1:
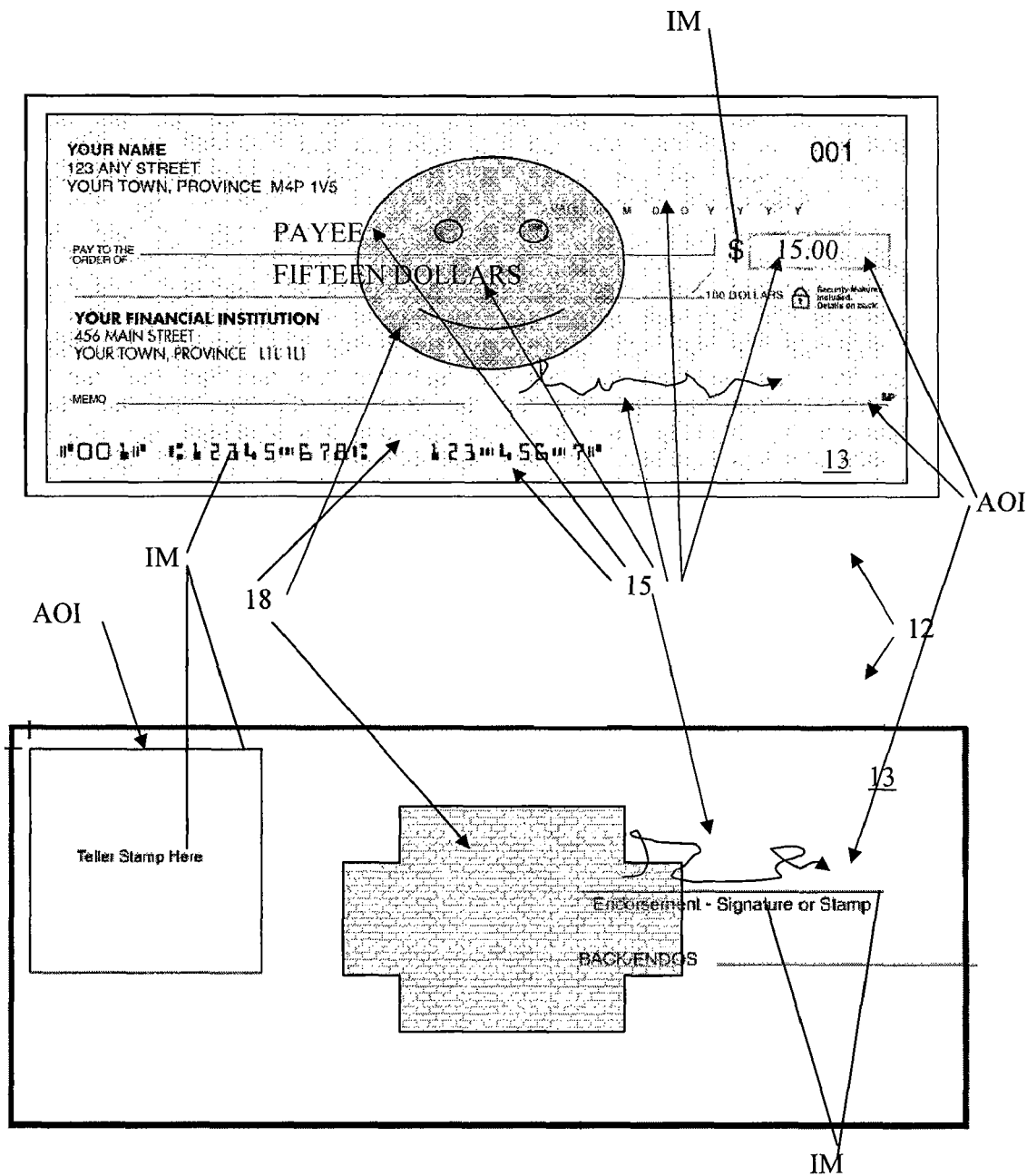
FIG. 1 is an exam item as a check.
Figure 2:
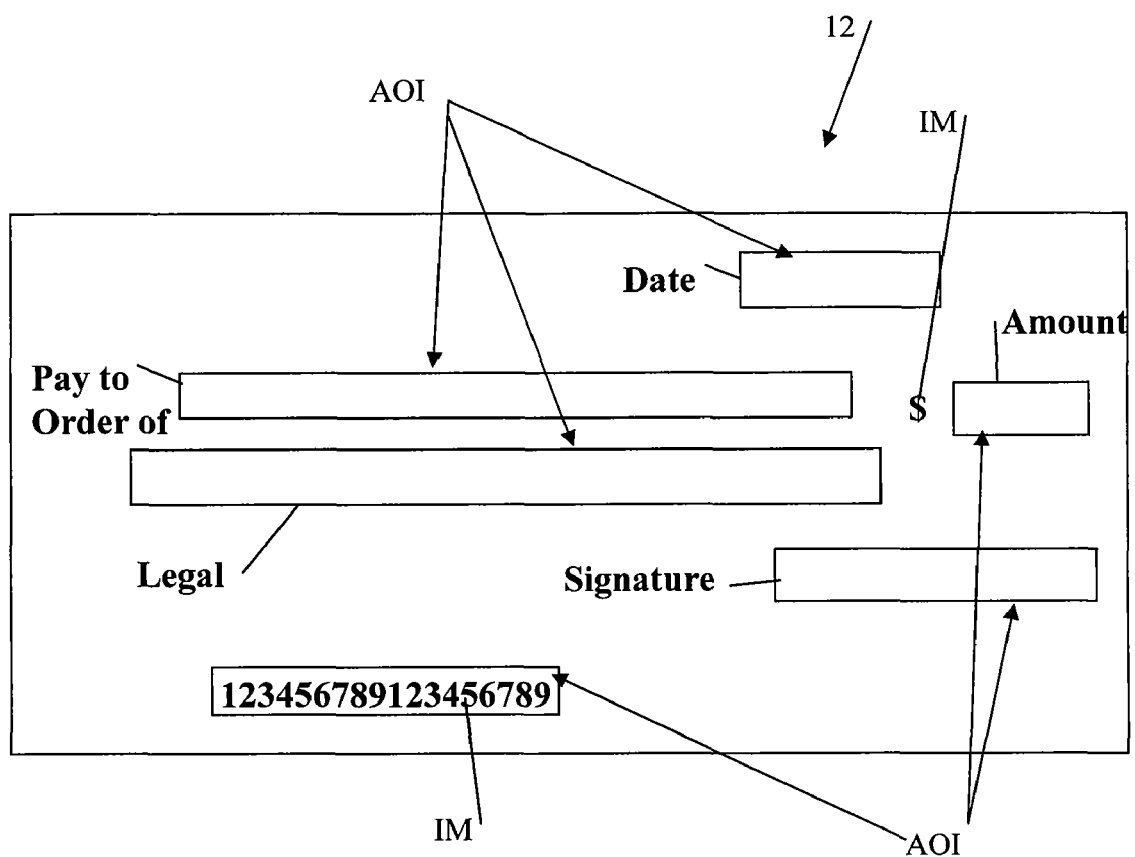
FIG. 2 shows example areas of interest of the item of FIG. 1.
Figure 3:
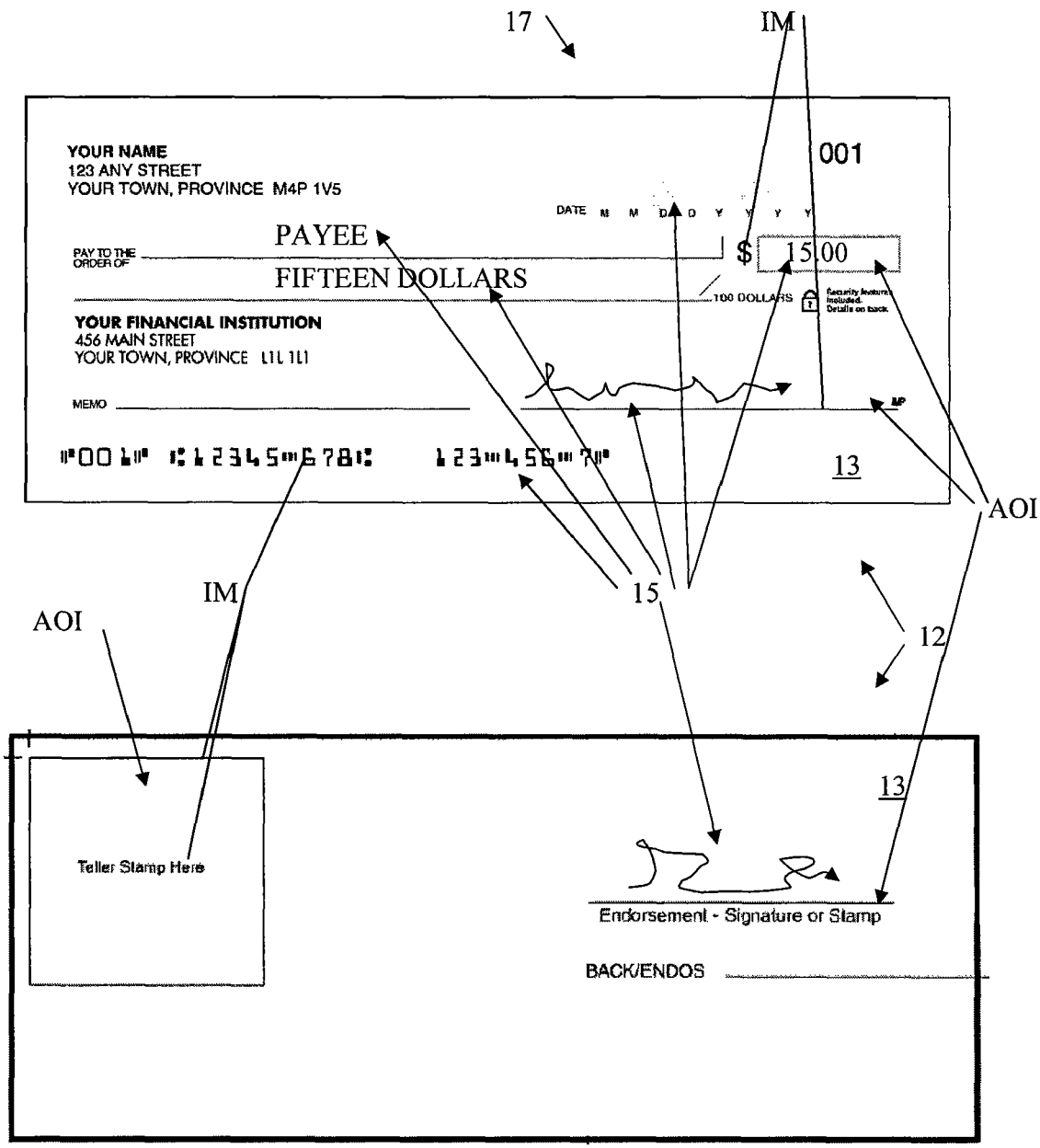
FIG. 3 shows an image of the item of FIG. 1 with background features removed.

Referring to FIG. 1, shown are two example paper documents (e.g. checks) 12 having a plurality of areas of interest (AOIs), see FIG. 2, which are considered as the areas on a document surface 13 that contain critical data 15 (e.g. signature) as well as interest markings IM that should be discernable in a recorded digital image 17 of the document surface 13 (see FIG. 3). In the case of where the document 12 is a check, the areas of interest AOI are such as but not limited to: Date; Payee; Numerical Amount; Legal Amount (Amount Spelled out); Signature Lines; and the MICR numbering line Area. In general, it is noted that the areas of interest AOI and the interest markings IM also contain background images 18 (e.g. pictures/images, designs, fill schemes, personal or business logo; font style; color; size and location background features and check fields—e.g. AOIs, etc.). These background images 18 must be designed such that they provide a desirable graphical design appeal of document surface 13 while at the same time do not occlude or otherwise interfere with the quality of the digital image recording of the critical data 15 located in the areas of interest AOI as well as occlude or otherwise interfere with the image quality of the interest markings IM. It is recognised that the image capturing process of the item surface 13 provides for the conversion of the item surface 13 via scanning and binary conversion (i.e. into a plurality of pixel values) of the critical data 15 (e.g. handwriting) from the areas of interest AOI. and the interest markings IM. It is also recognised that the background images 18 should not occlude the interest markings IM on the surface 13 of the document 12, such as but not limited to the MICR data, specified text (e.g. "Teller Stamp Here Box"), the dollar sign, etc. In any event, it is recognised that the background images 18 should drop out from the AOIs (so that any critical data 15 resident in the AOIs will not be occluded) and the background data 18 should also drop out from the surface 13 areas adjacent to the interest markings IM that the interest markings IM are legible in the image 17 of the document 12.

It is recognised that the documents 12 can be manufactured using a variety of different stock materials 16 such as but not limited to different versions of paper, etc. It is also recognised that the documents 12 can be embodied as any document that has a requirement for image quality of selected areas (e.g. AOIs) of the document surface 13, such that the selected area(s) (e.g. AOI(s), IM(s)) of the image 17 (e.g. scanned), see FIG. 3, of the document 12 satisfy specified PCS threshold(s) 20 (see FIG. 5). Examples of the documents 12 are such as but not limited to: checks; coupons; forms; and other documents 12 suitable for having the scanned image 17 (e.g. a grey scale image) recorded of the document surface 13 (e.g. front side and/or backside of the document 12).

Referring to FIG. 2, shown are example areas of interest AOI and interest markings IM for a check embodiment of the document 12, as discussed above. It is also recognised that the areas of interest AOI for a form and/or coupon can be areas such as but not limited to: signature region, identification number/information; visible security feature positioned on document surface 13; logo or other visible icon(s); etc. Referring to FIG. 3, shown is the digital image 17 of the document 12 of FIG. 1, such that the background images 18 (see FIG. 1) have not occluded the critical data 15 resident in the areas of interest AOI, nor the IMs.

Print Contrast Signal

Figure 4:
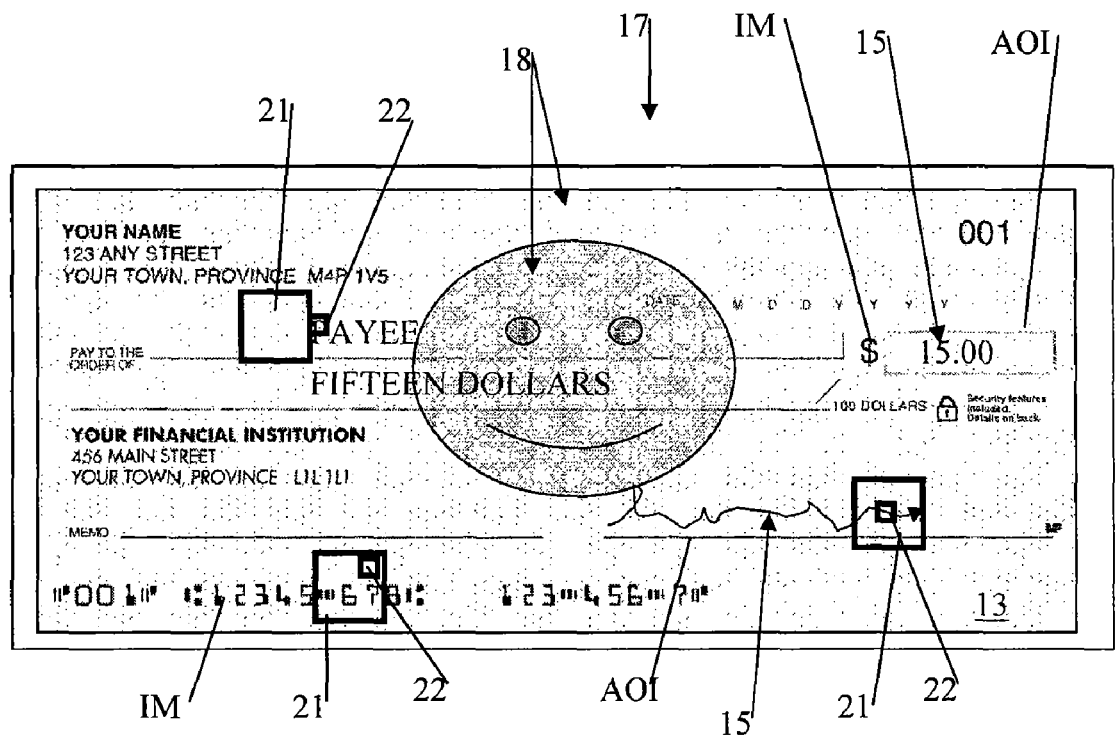
FIG. 4 shows example target portions and defined reference portions used in calculation of PCS for the target portions in the check of FIG. 1.

In optical character recognition for the present system 10, see FIG. 4 note, not to scale, the PCS is a measure of the contrast between a selected target portion 21 (e.g. a target pixel or group of pixels) of the imaged document 12 (see FIG. 1) and a defined region 22 of the imaged document 12 adjacent/around the selected target portion 21 (e.g. a series of background image 18 pixels adjacent to the target pixel), note—the absolute sizing of the target portion 21 and the defined region 22 are not to scale and are for illustrative purposes only. The target portion 21 is characterized based on location of the target portion 21 on the surface 13 of the document 12. For example, in the case of a target portion 21 located in the dollar sign area (e.g. IM) of the check 12, the desired PCS will be large (e.g. the dollar sign should have a high contrast as compared to its surrounding background image 18). In the case of selected AOIs (e.g. Payee, Signature, etc.), the PCS should have a negligible value (e.g. the AOIs should be blank when the background image 18 is digitally removed from the image 17 of the document 12). In the case of the endorsement line and phrase "Endorsement signature or Stamp" (e.g. IMs), the PCS should be 0.60 minimum (e.g. the endorsement line and indication IM should be discernable from the background image 18 in the digital image 17 of the document 12).

It is recognised that the target portion 21 may contain only a portion of the AOIs/IMs and the defined region 22 may contain only a portion of the background image 18, the target portion 21 may contain only a portion of the background image 18 and the defined region 22 may contain only a portion of the AOIs/IMs, the target portion 21 may contain both a portion of the background image 18 and a portion of the AOIs/IMs, and/or the defined region 22 may also contain both a portion of the AOIs/IMs and a portion of the background image 18, for example. It is also recognised that both the target portion 21 and the defined region 22 may both contain only a portion of the background image 18, for example. The size of the defined region 22 can selected so as to provide for at least some of the background image 18 is included in each target portion 21 selected iteratively about the surface 13 of the document 12 (see FIG. 7). The size of the defined region 22 can be chosen to be larger than the size of the target portion 21. For example, the target portion 21 can be one or more pixels that is smaller in extent than the relatively larger (in relation to the number of pixels of the target portion 21) number of pixels comprising the defined region 22. For example, the target portion 21 can be one or more pixels (e.g. one pixel) that would fit within (e.g. centered) the grouping of defined region 22 pixels (e.g. comprising the extent of a ⅛ inch square area as per the ANSI, CPA standards).

Contrast can be defined as the range of optical density and/or tone on a document 12 as the extent to which adjacent areas (e.g. background image 18 adjacent to printed/written critical data 15 to be input in the AOIs, background image 18 adjacent to IM) on the document 12 differ in brightness. It is recognised that the degree of difference in lightness, brightness(i.e. contrast) between the AOIs/IMS and the adjacent background images 18 makes the critical data 15 (when input) and the IMs more or less distinguishable in the digital image 17 of the document 12. For example, the print contrast signal (PSC) can be calculated as=100% (defined region 22 reflectance−selected target portion 21 reflectance)/(defined region 22 reflectance). This means that measured reflectance (Rr) of a dynamically selected defined region 22 of the document image 17 can be compared with the measured reflectance (Rt) of the selected target portion 21 of interest, i.e. PCS=(Rr−Rt)/Rr. Examples of PCS thresholds 20 are: 0.3 maximum for all target portions 21 located within the CAR AOI; 0.6 minimum for all MICR characters (i.e. PCS with respect to the clear band background around the MICR characters); 0.6 minimum for the dollar sign; 0.3 maximum for the MICR clear band abound the MICR characters; etc.

Reflectance can be defined as the amount of light reflected from each particular marking/indication (e.g. background image 18, IM, etc.) that would be present on the surface 13 of the manufactured document 12. For example, for checks 12, the amount of light is reflected from each particular marking sample of paper and/or ink. An example reflectance scale is a range of 0% to 100%, where 0% is absolute black (considered the darkest colour/shade) and 100% is maximum diffuse reflectance of the entire incident light (considered the lightest colour/shade). For example, the ANSI standard for physical checks 12 for reflectance is specified at not less than 40% in all areas of interest AOI with the exception of the convenience amount area (i.e. CAR which contains the numerical amount), which is not less than 60%. If the background features 18 are recorded in the image 17 of the document 12 as too dark (i.e. reflectance is too low in the AOIs), the critical data 15 could drop out (e.g. be occluded) due to insufficient contrast between the overlapping background image 18 and critical data 15 in the image 17 taken of the document 12. The Convenience Amount Recognition (CAR) is the numerical amount area AOI shown in FIG. 1. It is critical that the banks can read the CAR rectangle and its corresponding print contrast signal (PCS) to assure the printed rectangle dropped out and did not interfere with automatic machine recognition of handwritten amounts in bank imaging equipment (not shown). It is recognised that low background reflectance causes low contrast and unintended dropout of vital information (e.g. critical data 15, IMs), while high contrast background patterns 18 can cause random background clutter to remain in the binary images 17 that renders critical data 15 (e.g. handwriting) and/or IMs ambiguous at best.

Referring to FIG. 4, shown is an example of the captured image 17 having an example target portions 21 containing individual pixel(s) having background features 18 as well as AOI regions and IMs, such that the target portion 21 is associated with a defined region 22 consisting of a plurality of pixels. It is recognised that the pixels of the image 17 can be represented as a collection/distribution of reflectance values (e.g. a reflectance map) containing same/different colors having one or more shades—e.g. according to a single colour scale such as but not limited to grey scale). For example, the colours of the background features 18 present item 12 can all be converted to a representative shade in a single colour scale (e.g. grey, brown, red, etc. scale) for use in determination of the colours respective reflectance value Rb in the items image 17 (see FIG. 4), for example as obtained from the image capture device 25. For example, the single colour scale can be a grey scale having 256 shades of grey, which are then used as a basis for conversion of the image 17 into the binary image (e.g. black or white). Further, it is recognised that the reflectance map can be represented in a single and/or multiple colour scales, as desired, such that the reflectance map contains a plurality of reflectance values having a greater resolution (e.g. greater number of potentially different reflectance values—e.g. on a pixel per pixel basis) of the representative surface 13 of the image 17, as compared to the resolution (e.g. number present on the surface 13) of the defined regions 22, e.g. the defined region 22 contains a subset of the total number of reflectance values in the reflectance map of the image 17.

Background clutter can be measured by creating the binary image 17 of the document 12 (e.g. not containing critical data 15 input into the AOIs), then converting the image 17 from gray scale to black-and-white using a standardized conversion process as is known in the art, and then measuring the clusters of black pixels (paxel count) which remain after conversion. As part of tested image 17 quality for documents 12, specifically the requirements (e.g. ANSI) focus on the areas of interest AOI for background drop out, such that the background features 18 will not occlude or otherwise adversely affect the image quality of the critical data 15 resident in the areas of interest AOI. As mentioned above, the paxels are formed in the image 17 through low reflectance of the background features 18 and/or the document material 16 in the areas of interest AOI. It is considered that the critical data 15 on the surface 13 of the document 12 should show up in the image 17 as darker than the surrounding background features 18 that may overlap the areas of interest AOI.

The results of the PCS calculation described above could be an indication of where the formation of dark (e.g. black) pixels, paxels, and/or paxel strings/combinations 22 in the image 17 would occur that would make it difficult for manual (by person) and/or automatic (e.g. OCR) recognition/identification/detection of the critical data 15 in the AOIs and/or the IMS of the image 17. One example of the paxel is a 0.01" by 0.01" block of black pixels (e.g. an example smallest area of a physical document 12 considered in capturing the electronic image 17. The paxel (e.g. a grouping of pixels) has to be complete (e.g. 66%), or at least a specified number of pixels (e.g. 6 of 9 pixels) in the paxel. For example, it has been found that individual pixels may not constitute a legibility problem, but 0.01" by 0.01" blocks of problematic legibility does, especially when joined together in the string of paxels.

Figure 6:
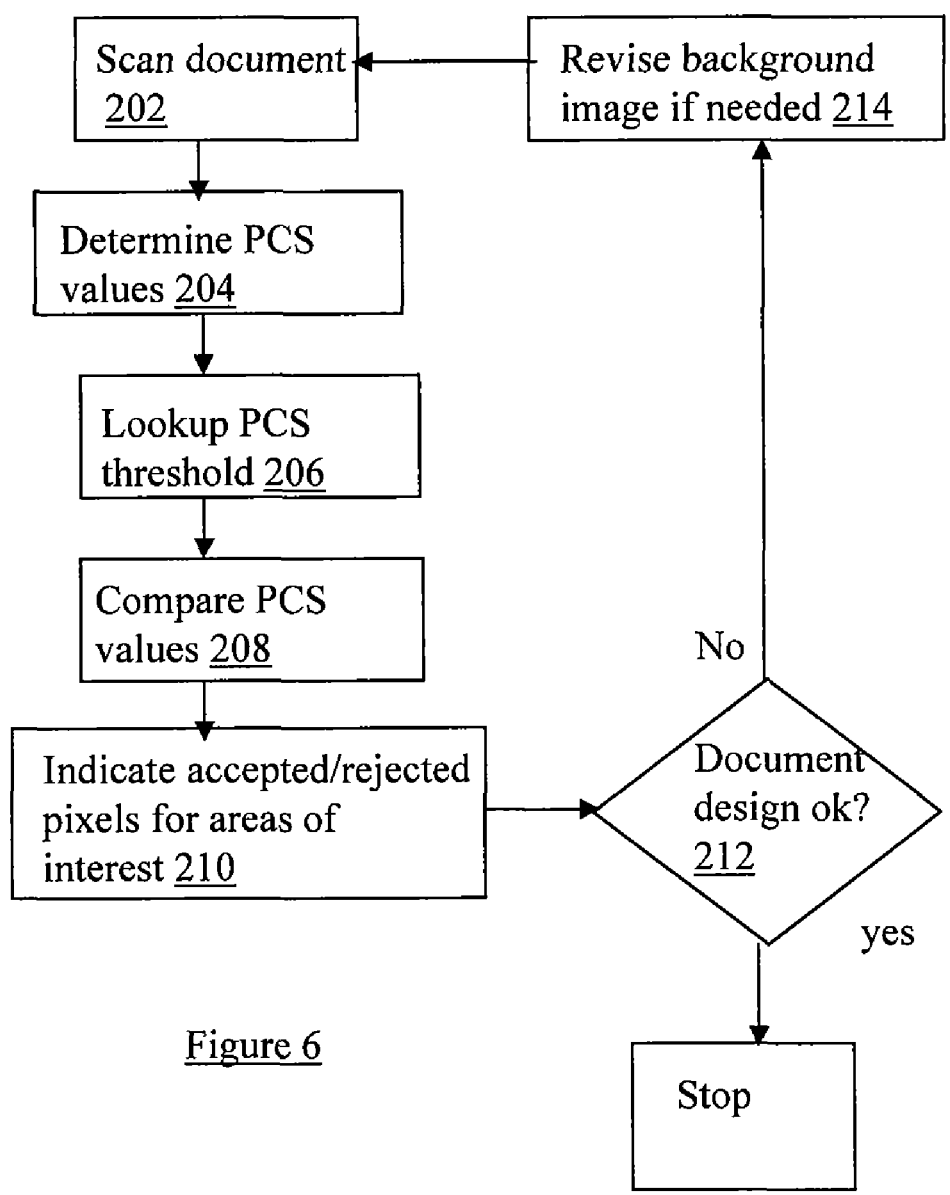
FIG. 6 shows a block diagram of an example operation of the document analysis environment of FIG. 5.

On the contrary to current systems the dynamic PCS based measuring process 200 of FIG. 6 is configured to determine the PCS for each target portion 21 selected iteratively over the surface 13 of the document 12, such that each target portion 21 is compared to a dynamically selected defined region 22 adjacent/around the target portion 21, so that the check designer can rearrange graphic features or modify the background features 18 for compliance of the design of the document 12 for PCS standards. The defined region 22 can be selected so as to be constant (for example) in size and positioned iteratively across the surface 13 at different locations 39 corresponding to the respective target portion 21. For example, the position/location 39 of each successively used defined region 22 changes to correspond with the location 39 of the respective target portion 21.

It is recognised that any target portions 21 that have a calculated PCS values not satisfying the specified PCS threshold(s) 20 (for the corresponding locations on the surface 13 of the document), these target portions 21 could be prone to forming the black pixels or grouping of pixels/paxels and therefore important information (i.e. critical data 15, IMs) risk being occluded in the image 17 created from the respective document 12. In other words, those target portions 21 that have PCS values that satisfy the specified PCS threshold(s) 20 can be considered by the document 12 designer as having design parameters that would inhibit adverse image quality of critical data 15 and/or IMs in the recorded digital image 17 of the surface 13 of the document 12.

Design System 10

Figure 5:
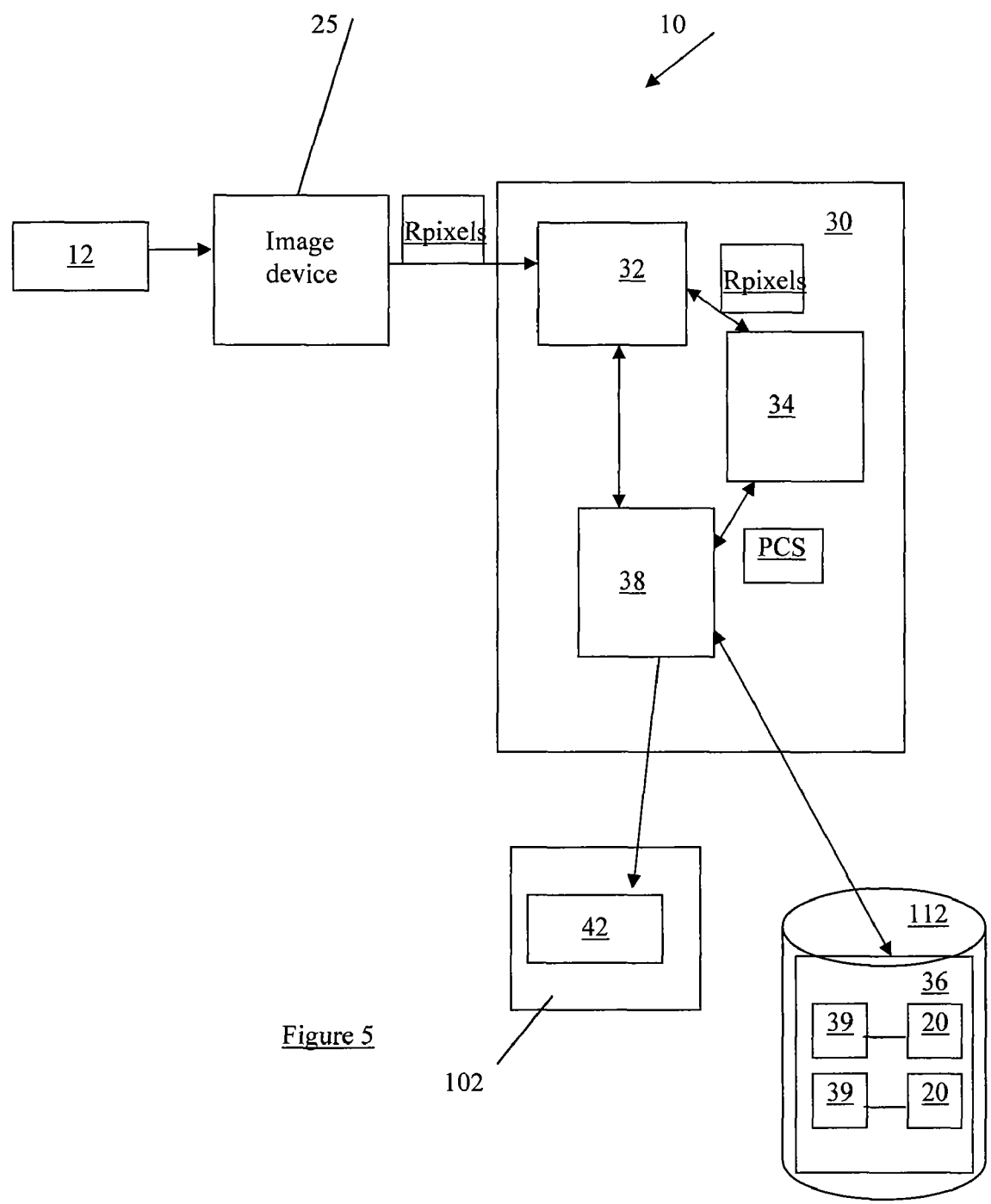
FIG. 5 shows an example document analysis environment.
Figure 7:
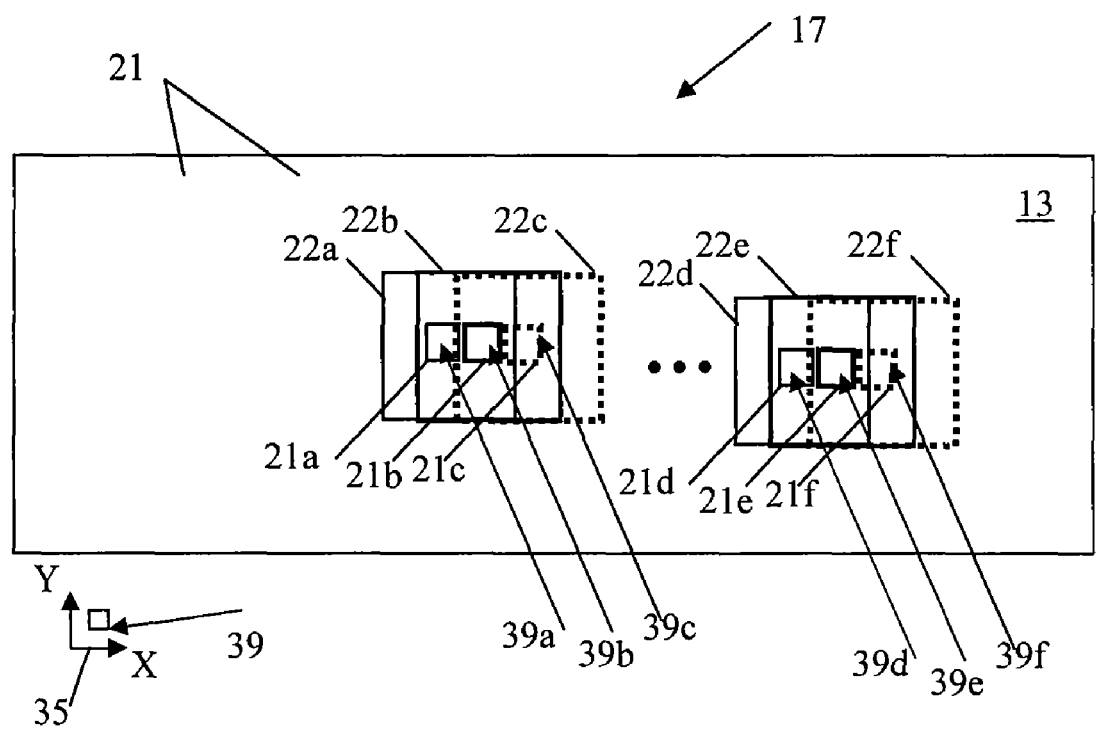
FIG. 7 shows an example determination of PCS values for the document analysis of FIG. 5.

Referring to FIGS. 4 and 5, shown is an document image testing system 10 for use in testing the AOIs and IMs reflectance against the reflectance of the background images 18 of the document 12 (e.g. check) based on target portions 21 and corresponding defined regions 22 iteratively selected across the surface 13 of the document 12 for all selected locations 39 (see FIG. 7).

It is recognised that the placement/position of the background features 18 on the item surface 13 could overlap the areas of interest AOI that are intended to include the critical data 15 (e.g. either to be placed on the physical item surface 13 by a user of the document 12 and/or during manufacture of the document 12) as well as the IMs. Examples of the critical data 15 and IMs are such as but not limited to: handwritten text/numbers; MICR data; security features; etc.

Referring again to FIG. 5, the design system 10 includes the document 12 for feeding into a digital image capturing device 25 (e.g. scanner, camera, etc.) configured to record the digital image 17 of the document 12. The image device 25 illuminates all of the areas (e.g. pixels) of the document 12 by a light source (not shown) and a detector (not shown) measures the intensity distribution of the light reflected by the illuminated areas of the document 12, e.g. on a pixel by pixel basis. The reflectance R for each pixel of the document 12 depends on the amount of. absorption and the scattering of the light from the surface 13 of the document 12, as measured by the image device 25. As such, it is recognised that the digital image 17 has a plurality of reflectance values R assigned to the pixels (or groupings of pixels) dependant upon the resolution of the image device 25. The reflectance values R are then received by an input module 32 of a PCS engine 30. A calculation module 34 then determines the PCS values for each of the selected target portions 21 using their reflectance value Rt and the reflectance value Rr of the corresponding defined regions 22 (e.g. a ⅛ inch square surrounding the centered target portion 21). The determined PCS values of the digital image 17 are then compared by a comparison module 38 to determine if each of the PCS values satisfies their respective PCS threshold 20 based on the location 39 (see FIG. 7) of the PCS value on the surface 13 of the document image 17. The PCS thresholds 20 are stored in a memory store 112 (e.g. threshold table) as assigned to a respective location 39 in a coordinate system 35 (see FIG. 7) of the digital image 17.

It is recognised that the reflectance value Rr for each of the defined regions 22 of the digital image 17 can be determined as an average (or some other appropriate combination) of the reflectance values of the each of the pixels included in the defined regions 22, as desired. As well, the reflectance value Rt for each of the selected target portions 21 of the digital image 17 can be determined as an average (or some other appropriate combination) of the reflectance values of the each of the pixels included in the target portions 21, as desired. In the most basic case, the reflectance value of a selected pixel is the determined reflectance value Rt of a single pixel target portion 21. For example each defined region 22 can be a specified size (e.g. such as ⅛ inches square) and therefore the reflectance value Rr of each of the defined region 22 of the surface 13 could be the average of the reflectance values for each of the pixels 21 determined in the defined region 22 (e.g. the defined regions represent the possible ⅛" square areas assigned to each of the targeted portions 21—as the ⅛ inch aperture as specified by the ANSI, CPA standards.).

It is recognised that a plurality of the target portions 21 make up the surface 13 of the digital image 17, as shown in FIG. 7 by example for a few target portion 21/defined region 22 combinations 21a-22a, 21b-22b, 21c-22c, 21d-22d, 21e-22e, 21f-22f, etc, located at respective locations 39a, 39b, 39c, 39d, 39e, 39f in the reference frame 35. In other words, the representative (e.g. average) reflectance value Rr of the pixels in the defined region 22a is used with the representative (e.g. single) reflectance value Rt of the pixel in the target portion 21a to calculate the PCS for the target portion 21a as PCSa=(Rra−Rta)/Rra, and then the representative (e.g. average) reflectance value Rr of the pixels in the defined region 22b is used with the representative (e.g. single) reflectance value Rt of the pixel in the target portion 21b to calculate the PCS for the target portion 21b as PCSb=(Rrb−Rtb)/Rrb, and then the representative (e.g. average) reflectance value Rr of the pixels in the defined region 22c is used with the representative (e.g. single) reflectance value Rt of the pixel in the target portion 21c to calculate the PCS for the target portion 21c as PCSc=(Rrc−Rtc)/Rrc, etc., until all of the PCS values for each of the targeted portions 21 of the digital image 17 are calculated across the surface 13 of the image 17 for all desired locations 39 (e.g. all pixels in the AOIs and IMs locations). For example, preferably each of the pixels of the AOIs and the IMs have a PCS value calculated and then compared to the corresponding PCS threshold 20 for that AOI/IM location 39 in the document 12.

It is recognised that the location 39 of each PCS calculation on the surface 13 is recognised so that the PCS value can be compared with the appropriate corresponding PCS threshold 20 for that location 39. In turn, as further described below, each of the calculated PCS values is then compared with the PCS threshold values 20 stored in a PCS threshold table 36, based on location (e.g. X-Y coordinates in an defined X-Y coordinate reference frame 35 of the image 17). These PCS value thresholds 20 are stored in the threshold table 36 that is accessible by the comparison module 34 in the memory 112, such that a threshold 20 is specified for each combination of the location 39 and threshold 20.

Referring again to FIG. 5, the comparison module 38 produces a plurality of compared PCS value results 42, representing those target portion 21 PCS values that satisfied their respective threshold 20. The results 42 can be presented on a user interface 102 (e.g. a display) for subsequent review by the document designer.

Operation of the System 10

Referring to FIGS. 1, 5 and 6, shown is a process 200 for operating the system 10 for use in producing the results 42 of the document 12 that is determined as those target portions 21 that satisfied the PCS threshold(s) 20 for the assigned dynamic defined regions 22 positioned on the surface 13 of the document image 17.

Referring to FIG. 6, step 202 of the design process 200 provides (e.g. via the imaging device 25) reflectance values R for pixels of the document 12, including the AOIs, background image(s) 18 and IMs. At step 204, the PCS engine 30 determines the PCS values for each target portion 21 of the surface 13 of the image 17. At step 206, the PCS engine 30 looks up the corresponding PCS thresholds 20 from the table 26. At step 208, the PCS engine 30 compares the calculated PCS values with the appropriate PCS threshold(s) 20 to determine those target portions 21 results 42 that either satisfy or do not satisfy the PCS threshold(s) 20. At step 210, the accepted/rejected target portions 21 are shown to the designer via the user interface 102. At step 212, in the event that certain target portions 21 of the results 42 have unsatisfactory PCS values, the design parameters of the background image 18 are revised, including selection of the color(s) characteristics and/or color density of the background images, for example, the new printed document is produced, and steps 202, 204, 206, 208 are repeated. At step 212, if the document design is considered acceptable (e.g. does not contain a specified number of target portions 21 that have PCS values that do not satisfy the PCS threshold(s) 20), the document 12 design is deemed satisfactory. For example, the degree of target portions 21 that satisfy their PCS threshold value 20 is indicative of the acceptability of the design of the background image 18 when processed by the digital image recorder (e.g. scanner 25).

Example of PCS Engine 30

Figure 8:
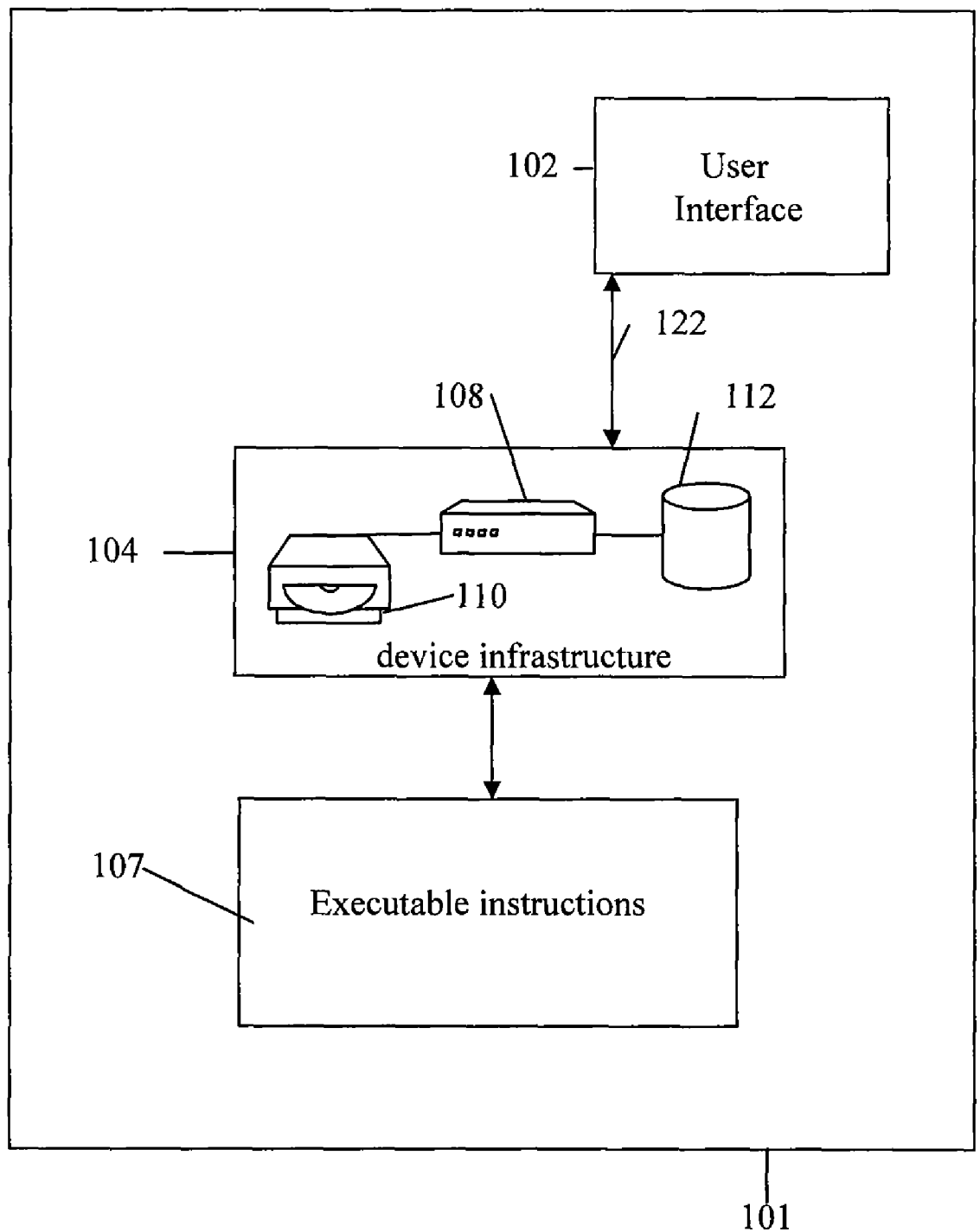
FIG. 8 shows an example embodiment of a computing system for the document analysis environment of FIG. 5.

Referring to FIG. 8, a computing device 101 of the PCS engine 30 can have a user interface 102, coupled to a device infrastructure 104 by connection 122, to interact with a document designer (not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 8, operation of the device 101 is facilitated by the device infrastructure 104. The device infrastructure 104 includes one or more computer processors 108 and can include an associated memory 112 (e.g. a random access memory). The computer processor 108 facilitates performance of the device 101 configured for the intended task (e.g. of the respective module(s) of the PCS engine 30) through operation of the user interface 102 and other application programs/hardware 107 (e.g. modules 32, 34, 38) of the device 101 by executing task related instructions. These task related instructions can be provided by an operating system, and/or software applications 107 located in the memory 112, and/or by operability that is configured into the electronic/digital circuitry of the processor(s) 108 designed to perform the specific task(s). Further, it is recognized that the device infrastructure 104 can include a computer readable storage medium 110 coupled to the processor 108 for providing instructions to the processor 108 and/or to load/update the instructions 107. The computer readable medium 110 can include hardware and/or software such as, by way of example only, magnetic disks, magnetic tape, optically readable medium such as CD/DVD ROMS, and memory cards. In each case, the computer readable medium 110 may take the form of a small disk, floppy diskette, cassette, hard disk drive, solid-state memory card, or RAM provided in the memory module 112. It should be noted that the above listed example computer readable mediums 110 can be used either alone or in combination.

Further, it is recognized that the computing device 101 can include the executable applications 107 comprising code or machine readable instructions for implementing predetermined functions/operations including those of an operating system and the PCS engine 30 modules, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the PCS engine 30 (e.g. modules) may be implemented in hardware, software or a combination of both. Accordingly, the use of a processor 108 as a device and/or as a set of machine-readable instructions is hereafter referred to generically as a processor/module for sake of simplicity. Further, it is recognised that the PCS engine 30 can include one or more of the computing devices 101 (comprising hardware and/or software) for implementing the modules, as desired. Further, it is recognised that the functionality of the modules 32,34,38 and the lookup table 36 can be as described above, can be combined and/or can be further subdivided, as desired. It is also recognised that the reflectance values R of the document 12 can be supplied by the scanner 25 to the input module 32 and/or can be calculated by the input module 32 from appropriate data included in the image 17 provided by the scanner 25 to the input module 32, as desired.

We claim:

1. A system for determining a plurality of PCS values for a document image representing a document having at least one area of interest on a surface of the physical item for containing critical data and a background image positioned on the surface, the document suitable for positioning in a digital image capture device, the system comprising:
    an input module configured for obtaining a plurality of reflectance values distributed across the surface of the document;
    a memory configured for storing a plurality of PCS threshold values assigned to a corresponding plurality of locations on the surface;
    a calculation module configured for determining respective PCS values of a plurality of target portions of the surface, each of the respective PCS values based on a target reflectance value of the corresponding target portion and a region reflectance value of a corresponding defined region located adjacent to the target portion on the surface, each of the defined regions being different for each of the target portions, each of the respective PCS values assigned a location of the surface representative of the location of the target portion, the size of the defined region being greater than the size of the target portion, the target reflectance values and the region reflectance values being determined from said plurality of reflectance values;
    a comparison module configured for determining from the memory a plurality of PCS threshold values having specified surface locations matching the assigned locations of the calculated PCS values and for comparing the PCS threshold values with the calculated PCS values to determine whether the target portions satisfy their respective PCS threshold values;
    wherein the degree of target portions that satisfy their PCS threshold value is indicative of the acceptability of the design of the background image when processed by the digital image capture device.

2. The system of claim 1 further comprising size of the defined regions being selected so as to include at least a portion of the background image and at least a portion of an AOI.

3. The system of claim 1 further comprising size of the defined regions being selected so as to include at least a portion of the background image and at least a portion of an IM.

4. The system of claim 1, wherein the defined region is constant and positioned iteratively across the surface at different locations corresponding to the respective target portion.

5. The system of claim 4, wherein the target portion is positioned within the defined region.

6. The system of claim 5, wherein the target portion is centered in the defined region.

7. The system of claim 4, wherein the defined region is ⅛ inch square in size.

8. The system of claim 7, wherein the target portion is one pixel in size.

9. The system of claim 1, wherein the target portion is positioned within the defined region.

10. The system of claim 1, wherein the sizes of the target portion and the defined region are selected from the group comprising: the target portion contain only a portion of the AOI and the defined region 22 contains only a portion of the background image; the target portion contains only a portion of the background image and the defined region contains only a portion of the AOI, the target portion contains both a portion of the background image and a portion of the AOI, the defined region contains both a portion of the AOI and a portion of the background image; and both the target portion and the defined region contain only a portion of the background image.

11. A method for determining a plurality of PCS values for a document image representing a document having at least one area of interest on a surface of the physical item for containing critical data and a background image positioned on the surface, the document suitable for positioning in a digital image capture device, the method comprising:
    obtaining a plurality of reflectance values distributed across the surface of the document;
    accessing a plurality of PCS threshold values assigned to a corresponding plurality of locations on the surface;
    determining respective PCS values of a plurality of target portions of the surface, each of the respective PCS values based on a target reflectance value of the corresponding target portion and a region reflectance value of a corresponding defined region located adjacent to the target portion on the surface, each of the defined regions being different for each of the target portions, each of the respective PCS values assigned a location of the surface representative of the location of the target portion, the size of the defined region being greater than the size of the target portion, the target reflectance values and the region reflectance values being determined from said plurality of reflectance values;
    determining from the memory a plurality of PCS threshold values having specified surface locations matching the assigned locations of the calculated PCS values; and
    comparing the PCS threshold values with the calculated PCS values to determine whether the target portions satisfy their respective PCS threshold values;
    wherein the degree of target portions that satisfy their PCS threshold value is indicative of the acceptability of the design of the background image when processed by the digital image capture device.

12. The method of claim 11 further comprising selecting the size of the defined regions so as to include at least a portion of the background image and at least a portion of an AOI.

13. The method of claim 11 further comprising selecting the size of the defined regions so as to include at least a portion of the background image and at least a portion of an IM.

14. The method of claim 11, wherein the defined region is constant and positioned iteratively across the surface at different locations corresponding to the respective target portion.

15. The method of claim 14, wherein the target portion is positioned within the defined region.

16. The method of claim 15, wherein the target portion is centered in the defined region.

17. The method of claim 14, wherein the defined region is ⅛ inch square in size.

18. The method of claim 17, wherein the target portion is one pixel in size.

19. The method of claim 11, wherein the target portion is positioned within the defined region.

20. The method of claim 11, wherein the sizes of the target portion and the defined region are selected from the group comprising: the target portion contain only a portion of the AOI and the defined region 22 contains only a portion of the background image; the target portion contains only a portion of the background image and the defined region contains only a portion of the AOI, the target portion contains both a portion of the background image and a portion of the AOI, the defined region contains both a portion of the AOI and a portion of the background image; and both the target portion and the defined region contain only a portion of the background image.

* * * * *